Feb. 2, 1965 S. N. GALVIN 3,168,184
GLASS TRANSFER APPARATUS
Filed April 23, 1963 4 Sheets-Sheet 1

TO VACUUM SYSTEM
NOT SHOWN

INVENTOR.
SAMUEL N. GALVIN
BY
ATTORNEY

Feb. 2, 1965  S. N. GALVIN  3,168,184
GLASS TRANSFER APPARATUS
Filed April 23, 1963  4 Sheets-Sheet 2

INVENTOR.
SAMUEL N. GALVIN
BY
ATTORNEY

Feb. 2, 1965 S. N. GALVIN 3,168,184
GLASS TRANSFER APPARATUS
Filed April 23, 1963 4 Sheets-Sheet 3

TO VACUUM SYSTEM
NOT SHOWN

TO VACUUM SYSTEM
NOT SHOWN

INVENTOR.
SAMUEL N. GALVIN
BY
ATTORNEY

Feb. 2, 1965   S. N. GALVIN   3,168,184
GLASS TRANSFER APPARATUS
Filed April 23, 1963   4 Sheets-Sheet 4

INVENTOR.
SAMUEL N. GALVIN
BY
ATTORNEY

United States Patent Office  
3,168,184  
Patented Feb. 2, 1965

3,168,184
GLASS TRANSFER APPARATUS
Samuel N. Galvin, Bethlehem, Pa., assignor to Ingersoll-Rand Company, New York, N.Y., a corporation of New Jersey
Filed Apr. 23, 1963, Ser. No. 275,003
6 Claims. (Cl. 198—20)

This invention relates to materials handling and more particularly to apparatus for and a method of transferring of sheet material from one conveyor line to another.

Heretofore it has been known that in order to transfer sheet material from one conveyor to another, an overhead gripping means was employed. The overhead gripping means was utilized to hoist up the sheets from one conveyor. Then the sheets would be transported by manual means to (and be positioned over and above) a second conveyor. Thereafter the sheets would be lowered down to the second conveyor.

This method was costly in that it required a number of men working to complete the process. In addition it was a slow, time consuming process and where the sheets were glass, if (during transport) they were not kept parallel at each end, turbulent wind currents would form. These wind currents would develop shattering forces and break the glass plates.

There have been several attempts to solve the above problems, as for example U.S. Patent No. 2,525,572 issued to Woody which relates to an automatic shake-up machine for flask type molds which utilizes a hydraulic cylinder which advances the transfer head in a direction of travel of the conveyor, providing synchronous travel therebetween to permit the grappling means on the transfer head to attach.

U.S. Patent No. 2,823,786 issued to Grogg relating to a mechanism for transferring waffles from a first conveyor to a second conveyor disposed parallel thereto. The mechanism relates to a chain drive for the overhead transfer carriage. However, this patent discloses means disposed in a transfer carriage for advancing the lifting head in the direction of travel of the waffle on the first conveyor for a period of time sufficient to lift the waffle by means of a vacuum lift.

U.S. Patent No. 2,862,633 issued to Stiles relates to a transfer mechanism which utilizes a lifting head carried by a swinging overhead arm. The lifting head is provided with a plurality of suction cups which communicate with a main suction supply line. There does not appear to be any means provided here, however, for advancing the lifting head in the direction of travel of the feed conveyor while the gripping means are attached, in order to be sure of a secure gripping or holding action.

It is the general object of the present invention to avoid and overcome the foregoing and other difficulties of and objections to prior art practices by the provision of a method of transferring sheet material from one conveyor to another wholly by automatic mechanical means.

Another object of the present invention is to provide a means for picking up sheet material from a conveyor moving at a variable speed whereby the lifting means is traveling at the same speed as the conveyor when said lifting occurs.

Still another object of the present invention is to reduce the overall transfer cycle time for transferring sheet material from one conveyor to another conveyor.

Yet another object of the present invention is to accomplish this transferring of sheet material from one conveyor to another by having the sheet material (being transferred) travel in a uniform parallel plane in order to avoid the induction of any turbulent flow which may cause cracking of glass sheets.

A further object of the present invention is to accomplish the transfer from one conveyor to another when the conveyors are moving at variable speeds with respect to each other and are situated at variable levels of elevation in relation to each other.

The aforesaid objects of the present invention and other objects which will become apparent as the description proceeds are achieved by providing a Hydra-boom assembly comprising, a base means. Arm means pivotally disposed on the base means. A first motion means operatively mounted on the arm means for achieving vertical reciprocating motion. A load carrying means mounted on the first motion means for carrying load. Gripping means disposed on the load carrying means to securely grip load. A second motion means disposed on the load carrying means to give the load carrying means horizontal motion. In addition a third motion means disposed on the base means and on the arm means to provide motion for the arm means.

The aforesaid objects of the present invention and other objects which will become apparent as the description proceeds are also achieved by providing a method of transferring plate material from a moving support to another support comprising the steps of picking up the plate material while moving in the same direction as the plate material for a predetermined distance. Raising the plate material from the moving support. Moving the plate material from alignment with the moving support to alignment with the other support, and releasing the plate material on to the other support.

For a better understanding of the present invention reference should be had to the accompanying drawings, wherein like numerals of reference indicate similar parts throughout the several views and wherein.

Although the principles of the present invention are broadly applicable to the transferring of sheet material from one conveyor to another conveyor the present invention is particularly adapted for use in conjunction with the moving of glass sheets from one conveyor to another and hence it has been so illustrated and will be so described.

Figure 1:
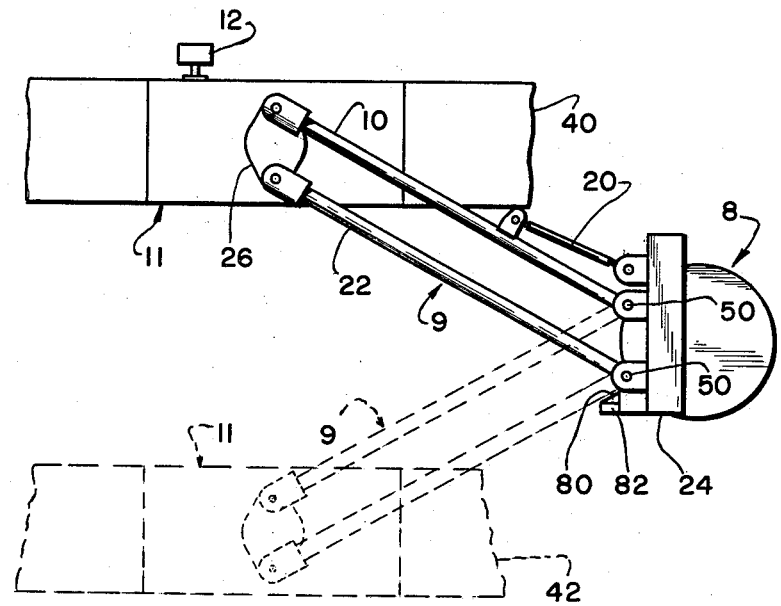
FIGURE 1 is a plan view of the boom assembly showing the Hydra-boom in solid line pick up position.

With specific reference to the form of the present invention illustrated in the drawings and referring particularly to FIGURE 1, a Hydra-boom assembly is indicated generally by the reference numeral 8, and has base means such as a boom base 24. On the boom base 24 an arm means such as an arm assembly 9 (composed of a boom arm 10, a frame lift bracket 26 and a boom arm link 22) is pivoted at 50 on the boom base 24. The arm assembly 9 is free to swing at any predetermined arc.

Figure 2:
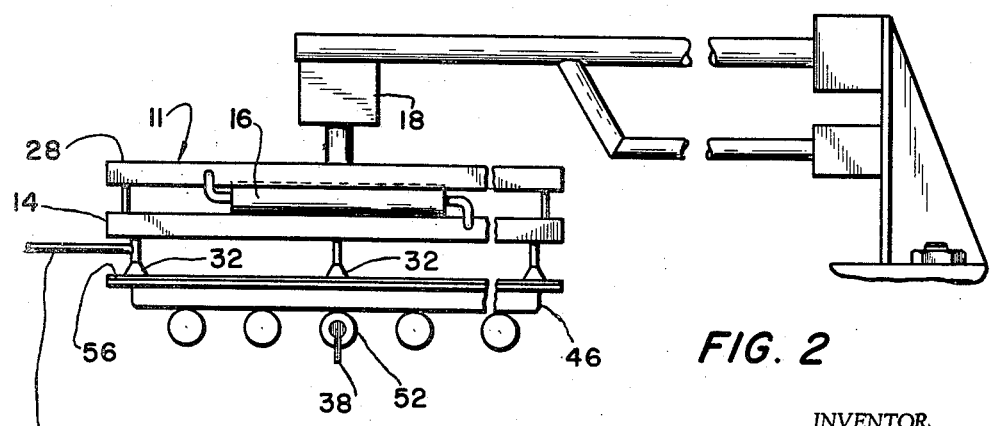
FIGURE 2 is a side view of FIGURE 1.

For the purpose of providing vertical reciprocating motion, a first motion means such as a lift cylinder 18 (FIGURE 2) is disposed on the frame lift bracket 26 of the arm assembly 9. For the purpose of carrying, supporting and uniformly distributing a load, and for accomplishing the transfer of glass plates from one conveyor to another, a load carrying means such as a frame assembly 11 (comprising of an extension cylinder 16, a roller track frame 28 and a pick up frame 14) is operatively disposed at the end of the lift cylinder 18. To accomplish the actual gripping of the load a gripping means such as a series of vacuum cups 32 are evenly distributed throughout the pick up frame 14. A third motion means such as a swing cylinder 20 (FIGURE 1) is provided to accomplish the rotation movement. The swing cylinder 20 has one end attached to the boom base 24 and the other end attached to the boom arm 10 as shown in FIGURE 1. As the swing cylinder 20 extends it rotates the arm assembly 9 in a clockwise direction thus accomplishing the swinging motion from the solid line position shown in FIGURE 1 to the dotted line position.

Figure 4:
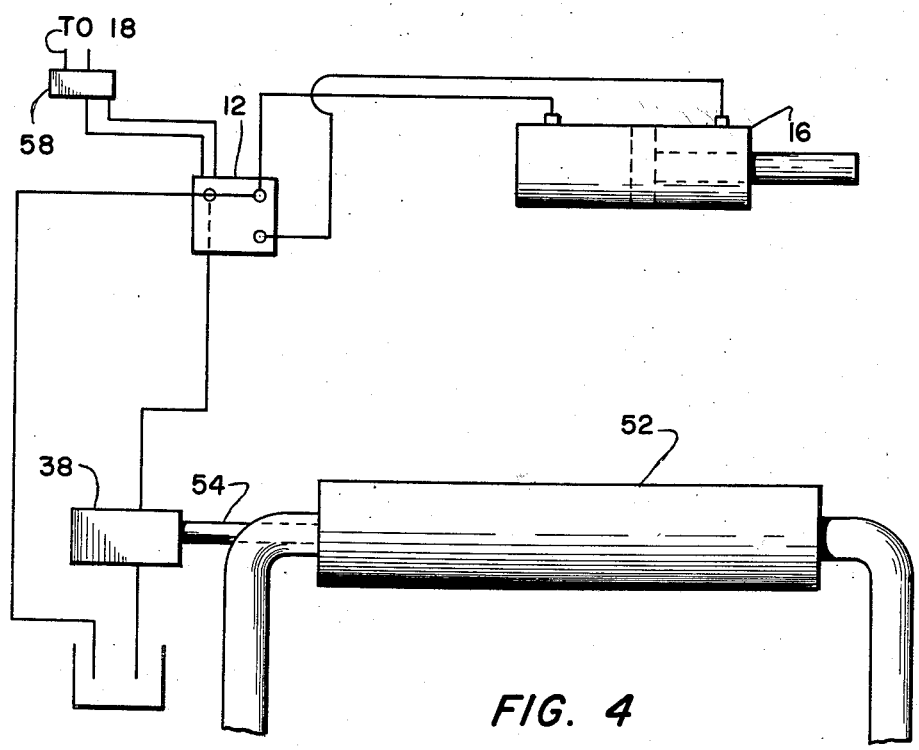
FIGURE 4 is a schematic diagram showing the position of a conveyor roller driver pump positioned on a roller of the conveyor line in relation to the extension cylinder.

In order to be sure that the vacuum cups 32 firmly take hold of the glass plate 56, the frame assembly 11 is so designed as to move in a horizontal traverse direction with the glass plate 56 at the same speed as the glass plate 56 while the glass plate 56 is still on a conveyor 40 and before the lifting is accomplished. This is accomplished by use of a second motion means such as the extension cylinder 16. The extension cylinder 16 is operated by a synchronizing means such as a conveyor roller driven pump 38 (FIGURE 4) which causes the extension cylinder 16 to extend and thus cause the frame assembly 11, to traverse with the glass plate 56 for a predetermined period of time in order to allow the vacuum cups 32 to take hold and securely grip on the plate 56. Since the conveyor 40 operates at a variable speed, in order to be sure that the frame assembly always traverses at the same rate of speed as the glass plate 56 on the conveyor 40, the conveyor roller driven pump 38 is mounted on and is driven by one of the conveyor rollers 52 as shown in FIGURE 4. It can be readily seen that as the speed of the conveyor 40 increases the roller circumferential speed will increase, thus increasing the r.p.m. of the pump shaft 54 (FIGURE 4) and increasing the output of the pump 38. This increase in the speed of the pump 38 in turn causes the extension cylinder 16 to extend at a faster rate of speed, thus causing the frame assembly 11 to move at a greater speed. Conversely as the conveyor speed decreases the roller circumferential speed will decrease thus decreasing the r.p.m. of the shaft 54 with attendant decrease in the output of conveyor roller driven pump 38 and resultantly causing the extension cylinder 16 to extend at a lesser rate of speed.

For the purpose of controlling the predetermined point where each operation will begin and end, a series of automatic switches, such as limit switches 12, 60, 70, 74, 82 and 90 are located at distinct points throughout the apparatus. It can be readily seen that by the use of this method complete automation is achieved. The employment and application of the limit switches is more clearly described hereinafter in the paragraph entitled "Operation."

Operation

Figure 3:
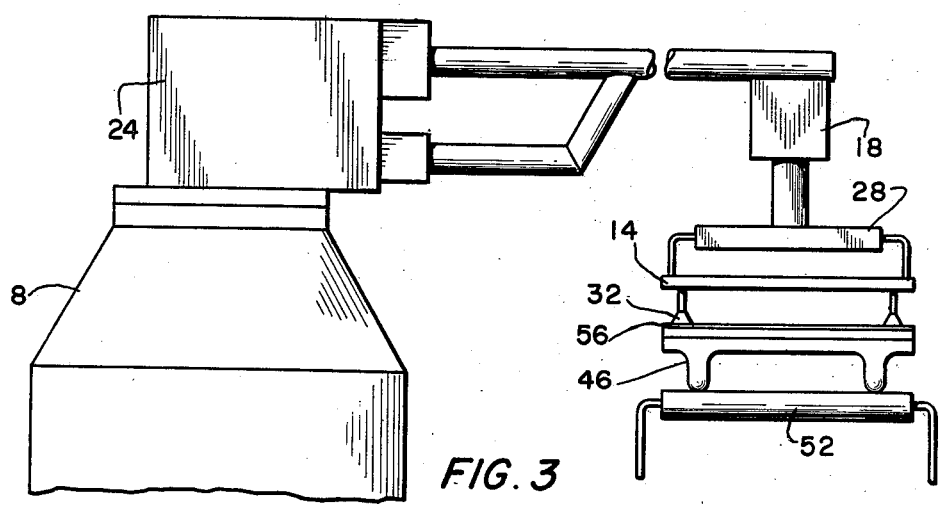
FIGURE 3 is an end view of FIGURE 1 as viewed from the right end of FIGURE 1.
Figure 5:
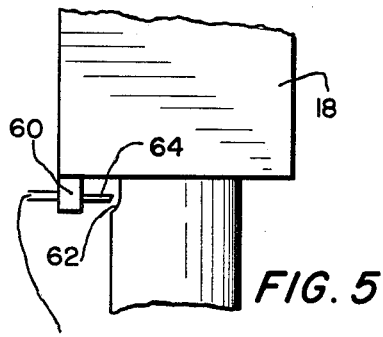
FIGURE 5 is a fragmentary diagrammatic front elevational view illustrating the position of the limit switch controlling the vacuum system, as it is positioned on a lift cylinder.
Figure 6:
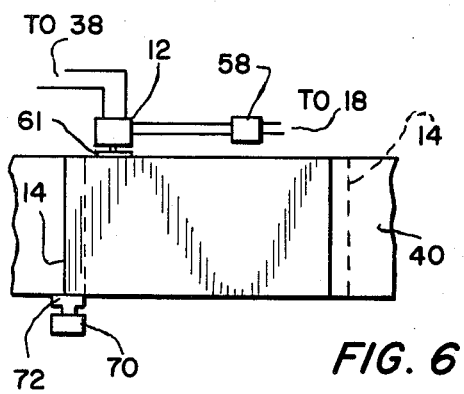
FIGURE 6 is a fragmentary diagrammatic plan view showing the motion of a pick up frame from the starting position (shown dotted) of the frame to the pick up position (solid).
Figure 11:
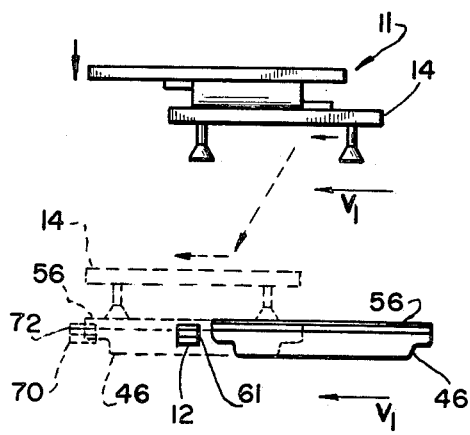
FIGURES 11 to 13 are side elevational schematic views showing the operation of the apparatus.

The transfer cycle starts with the pick up frame 14 in the dotted line position over the conveyor 40 (FIGURE 6), which is the grinding line for glass plate 56 (see also FIGURE 11). As the conveyor line car 46 (FIGURE 3) passes through and underneath the frame assembly 11 it engages a leg 61 of a standard type normally closed switch such as a limit switch 12 (FIGURE 6) thus activating limit switch 12. This switch 12 directs the discharge of the conveyor roller driven pump 38 to operate the extension cylinder 16, as shown in FIGURE 4, thus setting the boom 8 in operation. As the extension cylinder 16 is extended it moves the pick up frame 14 a predetermined distance from the dotted line position shown in FIGURE 6 to the solid line position, along the path of motion of the conveyor 40 upon which the glass plate 56, to be transferred, is resting. At the same time, and also activated by the limit switch 12 through the leg 61 a standard pump 58 (FIGURE 6) is activated to extend lift cylinder 18 so as to lower pick up frame 14. The apparatus moves from the solid line position shown in FIGURE 11 to the dotted line position as indicated by the arrows. When pick up frame 14 is lowered a sufficient predetermined amount, so as to have vacuum cups 32, disposed on frame 14, touching glass plate 56, a notch 62 on lift cylinder 18 lines up with leg 64 of a standard type automatic normally closed switch such as a limit switch 60 (as shown in FIGURE 5) disposed on lift cylinder 18. Leg 64 extends in notch 62 and in so doing activates switch 60 which in turn starts a standard vacuum mechanism, such as a vacuum compressor (not shown) in operation to create the required vacuum which provides the necessary grip force in vacuum cups 32 for gripping on to glass plate 56. These operations bring the frame 14 up to the glass plate 56, where the frame 14 is traveling at the same velocity as the plate 56 is traveling on the conveyor belt, and put the vacuum cups 32 in position to pick up the glass plate 56.

The pick up frame 14 now continues to move parallel to the travel of the plate glass 56 for a predetermined distance, which distance is controlled by the stroke and velocity of the extension cylinder 16 as shown in FIGURE 11 by the dotted line position. This allows time for the vacuum cups 32 to take hold and tightly grip the surface of the glass plate 56. The pick up frame 14 travels from the solid line position shown in FIGURE 11, until it reaches the end of its predetermined travel distance to the dotted line position shown in FIGURE 11 as indicated by the arrows. When the pick up frame 14 reaches the end of its traverse (dotted line position FIGURE 11) it trips a leg 72 of another automatic normally closed switch such as a limit switch 70 thus actuating limit switch 70. Limit switch 70 in turn redirects the flow of pump 58 (FIGURE 6) through the rear end of lift cylinder 18 to cause lift cylinder 18 to retract. The lift cylinder 18 raises the frame 14 and glass plate 56 a predetermined distance.

Figure 7:
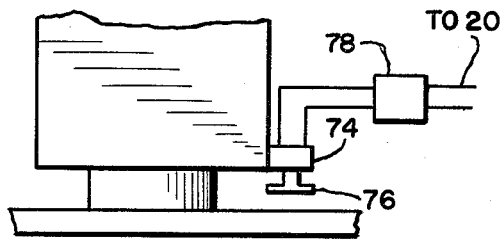
FIGURE 7 is a fragmentary diagrammatic front elevational view of the lift cylinder and the roller track frame illustrating the position of the limit switch controlling the swing cylinder in relation to the roller track frame.
Figure 12:
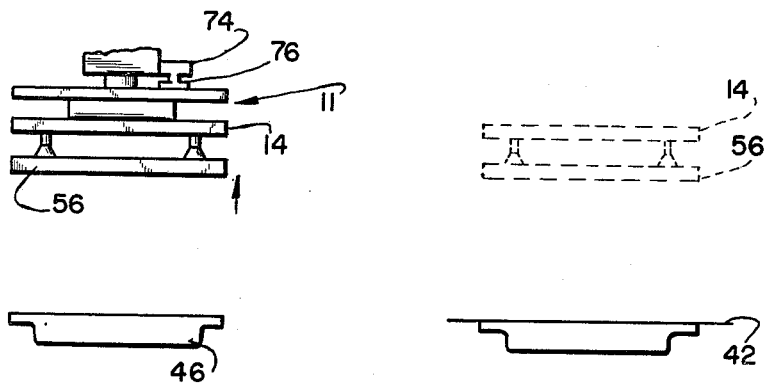

At the end of the raising stroke another automatic type normally closed switch, such as a limit switch 74, located on the lift cylinder 18, as shown in FIGURE 7, is actuated by the roller track frame tripping a switch leg 76. The limit switch 74 starts the pump 78 which causes swing cylinder 20 to extend. As the swing cylinder 20 extends it pushes against the boom arm 10 thus causing the arm assembly 9 to swing a predetermined radial arc and come to a stop over a second or a transfer line conveyor 42, whereon the glass plate 56 is to be deposited. The arm assembly 9 in its swing carries the frame assembly from the solid line position shown in FIGURE 12 to the dotted line position shown in FIGURE 12. The arm assembly 11 is of the linkage type which is designed to keep the boom arm 10 and the boom arm link 22 parallel at all times so that the plate 56 is always kept parallel. This avoids the creation of turbulent flow of air, and in so doing avoiding any cracking of the glass plates from forces created by the turbulent air currents.

Figure 8:
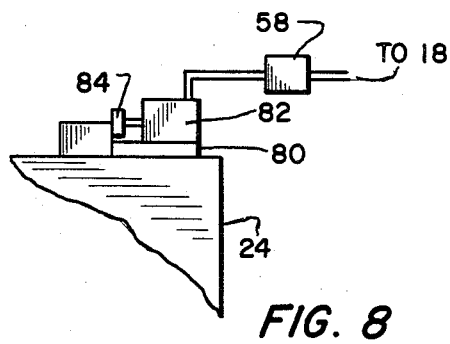
FIGURE 8 is a fragmentary side elevational view partially in section illustrating the employment of a positive stop and the location of the limit switch controlling the lowering of the glass plate to the second conveyor.
Figure 9:
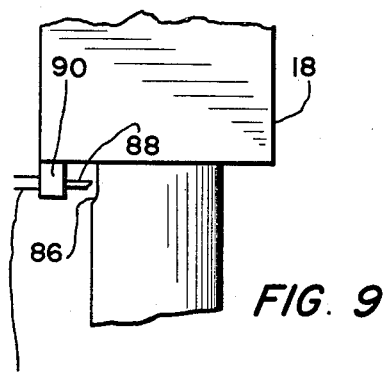
FIGURE 9 is a fragmentary diagrammatic front elevational view of the lift cylinder showing the position of the limit switch controlling the release of the vacuum system.
Figure 13:
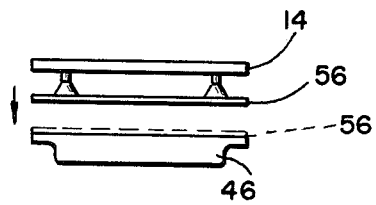

As the arm assembly 9 reaches a predetermined point in its circular path over transfer line conveyor 42 it hits a standard type positive stop 80 (FIGURE 1) which assures proper placement. Also at the same time as the arm assembly 9 hits the positive stop 80, the boom arm link 22 activates still another normally closed automatic switch, such as a limit switch 82, by tripping a switch leg 84, as shown in FIGURE 8. The limit switch 82 starts the pump 58 whose discharge causes the lift cylinder 18 to extend and lower the glass plate 56 a predetermined distance. As the glass plate 56 is lowered and the lift cylinder 18 is extended, the lift cylinder 18 extends to a predetermined point where a recess 86 on lift cylinder 18 lines up with a leg 88 of another automatic normally closed switch, such as a limit switch 90, as shown in FIGURE 9. As the leg 88 extends into the recess 86 the limit switch 90 is activated which switches off the vacuum apparatus, thus causing the cups 32 to release the glass plate 56 and deposit it on the transfer line conveyor 42 as shown in FIGURE 13 from the solid line position to the dotted line position. At the same time the switch 90, that switches off the vacuum apparatus, starts the transfer cycle again, by actuating the boom swing cylinder 20 and the extension cylinder 16. These cylinders swing the boom 8 back into place over conveyor line 40 and return the pick up frame 14 to the starting position simultaneously. The machine now has a predetermined hold time before the cycle is repeated. Thus it can be seen that the glass plate 56 is transferred from the conveyor 40 to the transfer line conveyor 42 wholly by automatic mechanical means.

Since the speed of the conveyor 40 upon which the plate 56 to be transferred is resting will vary, in order to be sure that the frame assembly will move above the plate to be transferred at the same velocity as the plate, the conveyor roller driven pump 38 is driven by a conveyor roller drive shaft 54 which is attached to one of the conveyor rollers 52 as shown in FIGURE 4. The discharge fluid from pump 38 is used to control extension cylinder 16. Thus it can be seen that the pump delivery can be made proportional to the roller and conveyor line speed and by proper designed cylinder size, valving, and pump drive gearing, the velocity of the frame assembly and of the conveyor 40 will always be the same.

It will be understood by those skilled in the art that the employment and operational use of limit switches 12, 60, 70, 74, 82 and 90 can be accomplished in any number of ways in addition to the employment herein described and illustrated in the drawings.

*Alternative embodiments*

Figure 10:
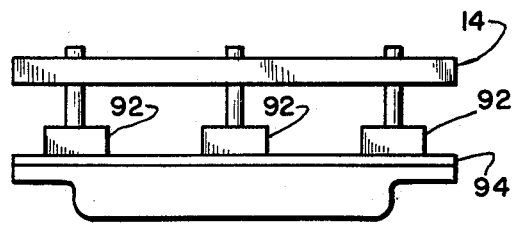
FIGURE 10 is a fragmentary diagrammatic side elevational view of an alternative embodiment of the gripping means shown in FIGURE 2.

It will be understood by those skilled in the art that alternatively, as illustrated in FIGURE 10, a series of magnets 92 can be used in the place of vacuum cups. The magnets 92 can be employed to transfer plate material 94 composed of metals such as ferrous metals. In addition in place of vacuum cups, friction or other pressure sensitive grabbing or clamping apparatus can be employed. Thus the Hydra-boom assembly can be used in the moving of steel, plastic or other type of sheet materials from one conveyor to another.

It will be recognized by those skilled in the art that the objects of the present invention have been achieved by providing an automatic mechanical means to transfer sheet material from one conveyor to another where said transfer is done wholly automatically at a greater rate of speed.

While in accordance with the patent statutes a preferred embodiment of the present invention has been illustrated and described in detail, it is to be particularly understood that the invention is not limited thereto or thereby.

I claim:
1. A Hydro-boom assembly for transferring plate load from a moving conveyor to another conveyor comprising in combination:
    (a) base means,
    (b) arm means pivotally mounted on said base means,
    (c) vertical motion means operatively mounted on said arm means for achieving vertical reciprocating motion,
    (d) load carrying means mounted on said vertical motion means to carry a plate load,
    (e) gripping means disposed on said load carrying means to securely grip said plate load to said load carrying means,
    (f) horizontal motion means disposed on said load carrying means and operatively connected to said load carrying means to give said load carrying means horizontal motion in order that said load carrying means travel in the same direction and at the same velocity as said plate load,
    (g) synchronizing means disposed on said moving conveyor and operatively associated with said horizontal motion means for synchronizing the motion of said horizontal motion means with the horizontal movements of the plate load before said gripping means contact said plate load, and
    (h) arcuate motion means disposed on said base means and on said arm means to provide motion for said arm means.

2. A Hydra-boom assembly for transferring plate load from a moving conveyor to another conveyor comprising in combination:
    (a) base means,
    (b) arm means pivotally mounted on said base means,
    (c) a first fluid extension cylinder operatively mounted on said arm means for achieving vertical reciprocating motion,
    (d) load carrying means mounted on said first fluid extension cylinder to carry a plate load,
    (e) gripping means disposed on said load carrying means to securely grip said plate load to said load carrying means,
    (f) a second fluid extension cylinder disposed on said load carrying means and operatively connected to said load carrying means to give said load carrying means horizontal motion,
    (g) a third fluid extension cylinder disposed on said base means and on said arm means to provide arcuate motion for said arm means,
    (h) means for synchronizing the horizontal movement of the pick up frame with the horizontal movement of the plate load before said gripping means contact said plate load.

3. A Hydra-boom assembly for transferring plate load from a moving conveyor to another conveyor comprising in combiantion:
    (a) base means,
    (b) arm means pivotally mounted on said base means,
    (c) a first fluid extension cylinder operatively mounted on said arm means for achieving vertical reciprocating motion,
    (d) a pick up frame mounted on said first fluid extension cylinder to carry a plate load,
    (e) gripping means disposed on said pick up frame to securely grip said plate load to said pick up frame,
    (f) a second fluid extension cylinder disposed on said pick up frame and operatively connected to said pick up frame to give said pick up frame horizontal motion,
    (g) a third fluid extension cylinder disposed on said base means and on said arm means to provide arcuate motion for said arm means,
    (h) synchronizing means disposed on said moving conveyor and operating said second fluid extension cylinder for synchronizing the horizontal movement of the pick up frame with the horizontal movement of the plate load before said gripping means contact said plate load.

4. A Hydra-boom assembly for transferring plate load from a moving conveyor to another conveyor comprising in combination:
   (a) base means,
   (b) arm means pivotally mounted on said base means,
   (c) a first fluid extension cylinder operatively mounted on said arm means for achieving vertical reciprocating motion,
   (d) a pick up frame mounted on said first fluid extension cylinder to carry a plate load,
   (e) vacuum cups disposed on said pick up frame to securely grip said plate load to said pick up frame,
   (f) a second fluid extension cylinder disposed on said pick up frame and operatively connected to said pick up frame to give said pick up frame horizontal motion,
   (g) a third fluid extension cylinder disposed on said base means and on said arm means to provide arcuate motion for said arm means,
   (h) synchronizing means disposed on said moving conveyor and operating said second fluid extension cylinder for synchronizing the horizontal movement of the pick up frame with the horizontal movement of the plate load before said vacuum cups contact said plate load.

5. A Hydra-boom assembly for transferring plate load from a moving roller conveyor having rollers to another conveyor comprising in combiantion:
   (a) base means,
   (b) arm means pivotally mounted on said base means,
   (c) a first fluid extension cylinder operatively mounted on said arm means for achieving vertical reciprocating motion,
   (d) a pick up frame mounted on said first fluid extension cylinder to carry a plate load,
   (e) vacuum cups disposed on said pick up frame to securely grip said plate load to said load pick up frame,
   (f) a second fluid extension cylinder disposed on said pick up frame and operatively connected to said pick up frame to provide to said pick up frame horizontal motion in order that said pick up frame travel in the same direction and at the same velocity as said plate load,
   (g) a pump disposed on said moving conveyor and operatively associated with said second fluid extension cylinder to control the motion of said second fluid extension cylinder, and
   (h) a third fluid extension cylinder disposed on said base means and on said arm means to provide arcuate motion for said arm means.

6. A Hydra-boom assembly according to claim 5 where said pump is driven by the rotation of one of said rollers thereby having the output of the pump be proportional to the rotational speed of said driving roller.

References Cited by the Examiner

UNITED STATES PATENTS

| | | | |
|---|---|---|---|
| 1,461,222 | 7/23 | Myers | 198—25 |
| 1,524,067 | 1/25 | Troutman | 214—152 |
| 1,761,881 | 6/30 | Donnelly. | |
| 2,213,774 | 9/40 | Taylor | 214—309 |
| 2,359,432 | 10/44 | McNamara. | |
| 2,380,306 | 7/45 | Hallowell. | |
| 2,611,493 | 9/52 | Nordquist. | |
| 2,823,786 | 2/58 | Grogg | 198—20 |
| 2,888,131 | 5/59 | Allen | 198—25 X |
| 3,059,794 | 10/62 | Lindeman | 214—152 |

HUGO O. SCHULZ, *Primary Examiner.*